United States Patent
Clark et al.

(10) Patent No.: US 10,778,517 B2
(45) Date of Patent: Sep. 15, 2020

(54) SYSTEM AND METHOD FOR VALIDATING CORRECTNESS OF CHANGES TO NETWORK DEVICE CONFIGURATIONS

(71) Applicant: Hewlett Packard Enterprise Development LP, Houston, TX (US)

(72) Inventors: Charles F. Clark, Roseville, CA (US); Craig Joseph Mills, Roseville, CA (US); Shaun Wackerly, London, KY (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 35 days.

(21) Appl. No.: 15/934,806

(22) Filed: Mar. 23, 2018

(65) Prior Publication Data
US 2019/0296971 A1 Sep. 26, 2019

(51) Int. Cl.
H04L 12/24 (2006.01)
H04L 12/26 (2006.01)
H04W 24/02 (2009.01)

(52) U.S. Cl.
CPC .......... *H04L 41/0816* (2013.01); *H04L 41/14* (2013.01); *H04L 41/22* (2013.01);
(Continued)

(58) Field of Classification Search
CPC ..... H04L 41/0816; H04L 41/14; H04L 41/22; H04L 43/50
(Continued)

(56) References Cited

U.S. PATENT DOCUMENTS 6,992,991 B2  1/2006 Duske et al.
7,062,546 B1  6/2006 Kolar et al.
(Continued)

FOREIGN PATENT DOCUMENTS

EP    2109254 A1    10/2009

OTHER PUBLICATIONS

Configuration Editor Tool (svcconfigeditor.exe), (Web Page), Mar. 30, 2017, 21 Pgs.
(Continued)

*Primary Examiner* — James E Springer
*Assistant Examiner* — Patrick F Ngankam
(74) *Attorney, Agent, or Firm* — Nolte Intellectual Property Law Group

(57) ABSTRACT

A network configuration change validation environment is disclosed. In particular, this disclosure is related to an interface to initiate automated test actions (e.g., network monitoring commands, application monitoring commands, etc.) and to view results in an efficient manner to support a network communication infrastructure. In one example, results of a set of commands executed prior to a configuration change may serve as a baseline and one or more results of the same set of commands may be intelligently compared to the baseline to identify any potential issues that have arisen. For example, as a result of a specific network configuration change or application update. The disclosed network change validation command initiator and validation report viewer represent part of an overall network configuration change validation environment that includes automated techniques such that it may be used within a given change window.

17 Claims, 6 Drawing Sheets

(52) U.S. Cl.
CPC .......... *H04L 41/5074* (2013.01); *H04L 43/50* (2013.01); *H04W 24/02* (2013.01)

(58) Field of Classification Search
USPC ........................................................ 709/221
See application file for complete search history.

(56) References Cited

U.S. PATENT DOCUMENTS

| | | | |
|---|---|---|---|
| 7,130,870 | B1 | 10/2006 | Pecina et al. |
| 8,060,862 | B2 | 11/2011 | Eldridge et al. |
| 8,156,213 | B1 | 4/2012 | Deng et al. |
| 8,248,958 | B1 | 8/2012 | Tulasi et al. |
| 8,291,403 | B2 | 10/2012 | Li et al. |
| 8,589,531 | B2 | 11/2013 | Mollitor |
| 8,736,611 | B1 | 5/2014 | Tulasi |
| 8,938,489 | B2 | 1/2015 | Suit et al. |
| 9,088,491 | B2 | 7/2015 | Vaidya et al. |
| 9,094,299 | B1 | 7/2015 | Rao et al. |
| 9,170,926 | B1 | 10/2015 | Cohen et al. |
| 9,247,436 | B2 | 1/2016 | Moore et al. |
| 9,369,431 | B1 | 6/2016 | Kirby et al. |
| 9,600,386 | B1 | 3/2017 | Thai et al. |
| 10,148,506 | B1 | 12/2018 | Anburose et al. |
| 2003/0208579 | A1 | 11/2003 | Brady et al. |
| 2004/0148367 | A1 | 7/2004 | Takano et al. |
| 2004/0221262 | A1 | 11/2004 | Hampapuram et al. |
| 2005/0174994 | A1 | 8/2005 | Park |
| 2006/0206864 | A1 | 9/2006 | Shenfield et al. |
| 2007/0168493 | A1 | 7/2007 | Sarwono et al. |
| 2008/0101419 | A1* | 5/2008 | Suriyanarayanan ........................ H04L 41/0853 370/503 |
| 2009/0276771 | A1 | 11/2009 | Nickolov et al. |
| 2011/0213480 | A1 | 9/2011 | Zila et al. |
| 2012/0209867 | A1 | 8/2012 | Agarwal et al. |
| 2013/0010626 | A1 | 1/2013 | Turcanu et al. |
| 2013/0166774 | A1 | 6/2013 | Pruthi et al. |
| 2013/0182712 | A1 | 7/2013 | Aguayo et al. |
| 2013/0254524 | A1 | 9/2013 | Snapir et al. |
| 2014/0280833 | A1* | 9/2014 | Gao .................. H04L 41/0213 709/223 |
| 2015/0220426 | A1 | 8/2015 | Spektor et al. |
| 2016/0224910 | A1* | 8/2016 | Deng .................. G06Q 30/016 |
| 2016/0291942 | A1 | 10/2016 | Hutchison |
| 2016/0344738 | A1 | 11/2016 | Dotan et al. |
| 2016/0344773 | A1 | 11/2016 | Knjazihhin et al. |
| 2017/0054601 | A1 | 2/2017 | Affoneh et al. |
| 2017/0102833 | A1 | 4/2017 | Kodali et al. |
| 2017/0255866 | A1 | 9/2017 | Lambe et al. |
| 2017/0272316 | A1 | 9/2017 | Johnson et al. |
| 2017/0308391 | A1 | 10/2017 | Nakanoya |
| 2018/0026834 | A1 | 1/2018 | Dec et al. |
| 2018/0069752 | A1 | 3/2018 | Igarashi |
| 2018/0131745 | A1 | 5/2018 | Shakir et al. |
| 2018/0136931 | A1 | 5/2018 | Hendrich et al. |
| 2019/0108041 | A1 | 4/2019 | D'Ercoli et al. |

OTHER PUBLICATIONS

Huang, Z. et al., SAIC: Identifying Configuration Files for System Configuration Management, (Research Paper), Nov. 6, 2017, 17 Pgs.
Langemak, J., Streamlining Network Change Validation and Testing, (Web Page), Jun. 4, 2016, 9 Pgs.
Droms, "Dynamic Host Configuration Protocol", RFC 2131, 1997 (Year: 1997).
Enns et al., "Network Configuration Protocol (NETCONF)", RFC 6241, 2011 (Year: 2011).
Enns, "NETCONF Configuration Protocol", RFC 4741, 2006 (Year: 2006).
European Search Report and Search Opinion Received for EP Application No. 19163649.7, dated May 14, 2019, 8 pages.
European Search Report and Search Opinion Received for EP Application No. 19163655.4, dated May 14, 2019, 8 pages.
European Search Report and Written Opinion received for EP Patent Application No. 19163658.8, dated Jul. 31, 2019, 8 pages.
Kundrat et al., "YANG/NETCONF ROADM: Evolving Open DWDM Toward SDN Applications", vol. 36, No. 15. 2018, 10 pages.
Merriam-Webster, "Definition of Augment", 2018, 1 page.
Pugdeethosapol et al., "Dynamic Configuration of the Computing Nodes of the ALICE O2 System," IEEE, 2016 13th International Joint Conference on Computer Science and Software Engineering (JCSSE), 2016, 5 pages.

* cited by examiner

SYSTEM AND METHOD FOR VALIDATING CORRECTNESS OF CHANGES TO NETWORK DEVICE CONFIGURATIONS

RELATED APPLICATIONS

This application is related to U.S. patent application Ser. No. 15/934,824, entitled, "System for Simultaneous Viewing and Editing of Multiple Network Device Configurations," by Charles F. Clark, et al., filed concurrently herewith, which is hereby incorporated by reference in its entirety for all applicable purposes. This application is also related to U.S. patent application Ser. No. 15/934,830, entitled, "System and Method to Provide Network Insights for Correct and Efficient Network Configuration," by Charles F. Clark, et al., filed concurrently herewith, which is hereby incorporated by reference in its entirety for all applicable purposes.

BACKGROUND

Today's infrastructure networks are becoming more and more complicated and are including ever increasing numbers of devices with network capabilities. The Internet of Things (IoT) growth represents one growth area that cause enterprise networks, for example, to include substantially more network connected devices as compared to their historical requirements. One side-effect of adding such a large volume of connected devices is that infrastructure networks (e.g., corporate private networks) have become more complicated and may require additional network support devices such as routers, bridges, domain name servers, network time protocol (NTP) servers, gateways, etc. Each of these network support devices (or simply "network devices") requires a configuration of network parameters in order to function as desired within the possibly complex network architecture. In some cases, changing the configuration of a network device may have unforeseen and unintended consequences to the stability, reliability, and performance of a corporate infrastructure network or portion thereof (e.g., a subnet). This is, in part, because changes to one network device may inadvertently affect the performance or connectivity of other devices in the network.

Prior art methods for determining correctness of a network change may not be completely automated. In some cases, network administrators simply make the change they believe will work and hope for the best. In other cases, limited test criteria may be performed after a network change in an ad-hoc manner to determine if the network "appears" to be functioning properly. However, if a subtle error is introduced to a network without large scale impact, it may be days or weeks before someone discovers that a printer or other device has lost its connection. Loss of network connection by devices is just one of the possible consequences to an unvalidated change. In other cases, a slight performance degradation may occur and not be noticed until a much later point in time. The degradation resulting in poor or less than optimal productivity of the devices (and possibly workforce) reliant on the network infrastructure. In other cases, the consequences of a subtle error may introduce a security vulnerability that can lead to potentially significant consequences if this vulnerability is exploited by an attacker. In short, incorrect configuration settings for network devices may cause undesired network performance, or even network failure. Accordingly, care should be taken when setting or adjusting configuration parameters of network devices.

BRIEF DESCRIPTION OF THE DRAWINGS

For a detailed description of various examples, reference will now be made to the accompanying drawings, in which.

DETAILED DESCRIPTION

Figure 1:
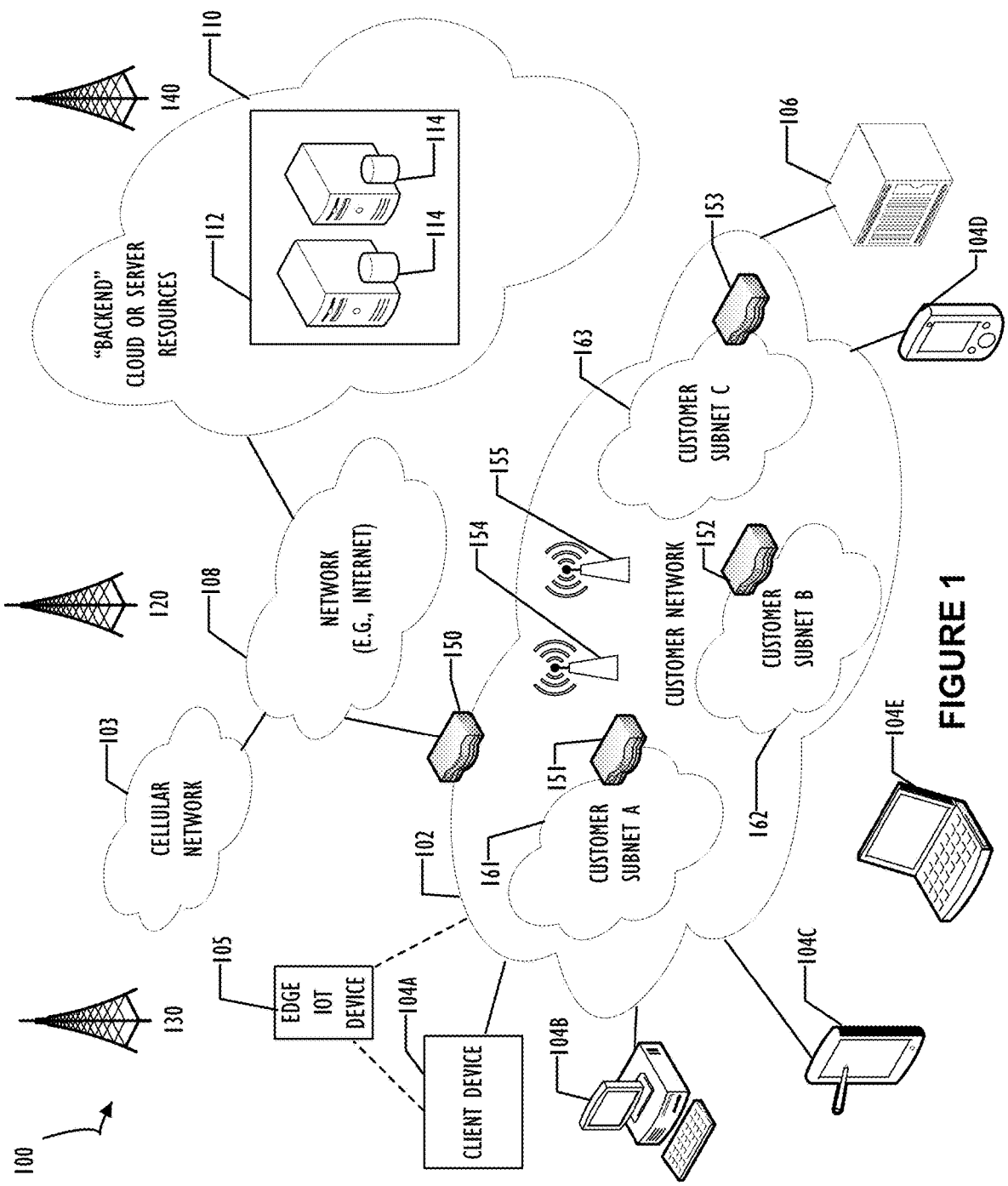
FIG. 1 is a block diagram representing an example of a networked computing infrastructure where implementations of the present disclosure may operate.

This disclosure is directed to a network configuration change validation environment to improve network stability and correctness as part of planned configuration changes to network devices. The disclosed systems and methods may also be useful in detecting unplanned changes in network performance and isolating a root cause of network issues. For example, detecting that a denial of service ("DOS"), or other malicious attack is affecting a network infrastructure. In particular, but not by way of limitation, this disclosure is related to an interface to initiate automated test actions (e.g., network monitoring commands, application monitoring commands, etc.) and view results in an efficient manner to support a network communication infrastructure. In one example, results of a set of commands executed prior to a configuration change may serve as a baseline and one or more results of the same set of commands may be intelligently compared to the baseline to identify any potential issues that have arisen (e.g., as a result of a specific network configuration change or application update).

In practice, when network administrators make configuration changes to their network devices, these changes must be made within an allocated 'change window' timeframe. These change windows are often short, to minimize disruption to the business. In addition to making the configuration change within this change window, the network administrators are expected to also validate that the changes have resulted in the desired new network operation and that there are no new undesired consequences. If there are undesired consequences, they need to roll-back the changes within the same, and likely short, change window. The validation of correct operation may be challenging because of the time and effort required to construct and execute the operations that query the network state, and the difficulty of determining the differences between the operational state of the network before and after the change.

To address issues related to prior art network configuration change techniques, this disclosure presents methods and systems to improve the complex technical art of network administration. In particular, the disclosed network change validation command initiator and validation report viewer represent part of an overall network configuration change validation environment that is more fully automated than previous solutions to assist in more comprehensive validation within a given change window.

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system. The term also may be used to refer to a number of such electronic computing devices in electronic communication with one another.

As used herein, the term "medium" refers to one or more non-transitory physical media that together store the contents described as being stored thereon. Examples may include non-volatile secondary storage, read-only memory (ROM), and/or random-access memory (RAM). Such media may be optical or magnetic.

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g., for a customer in that customer's isolated instance).

Figure 5:
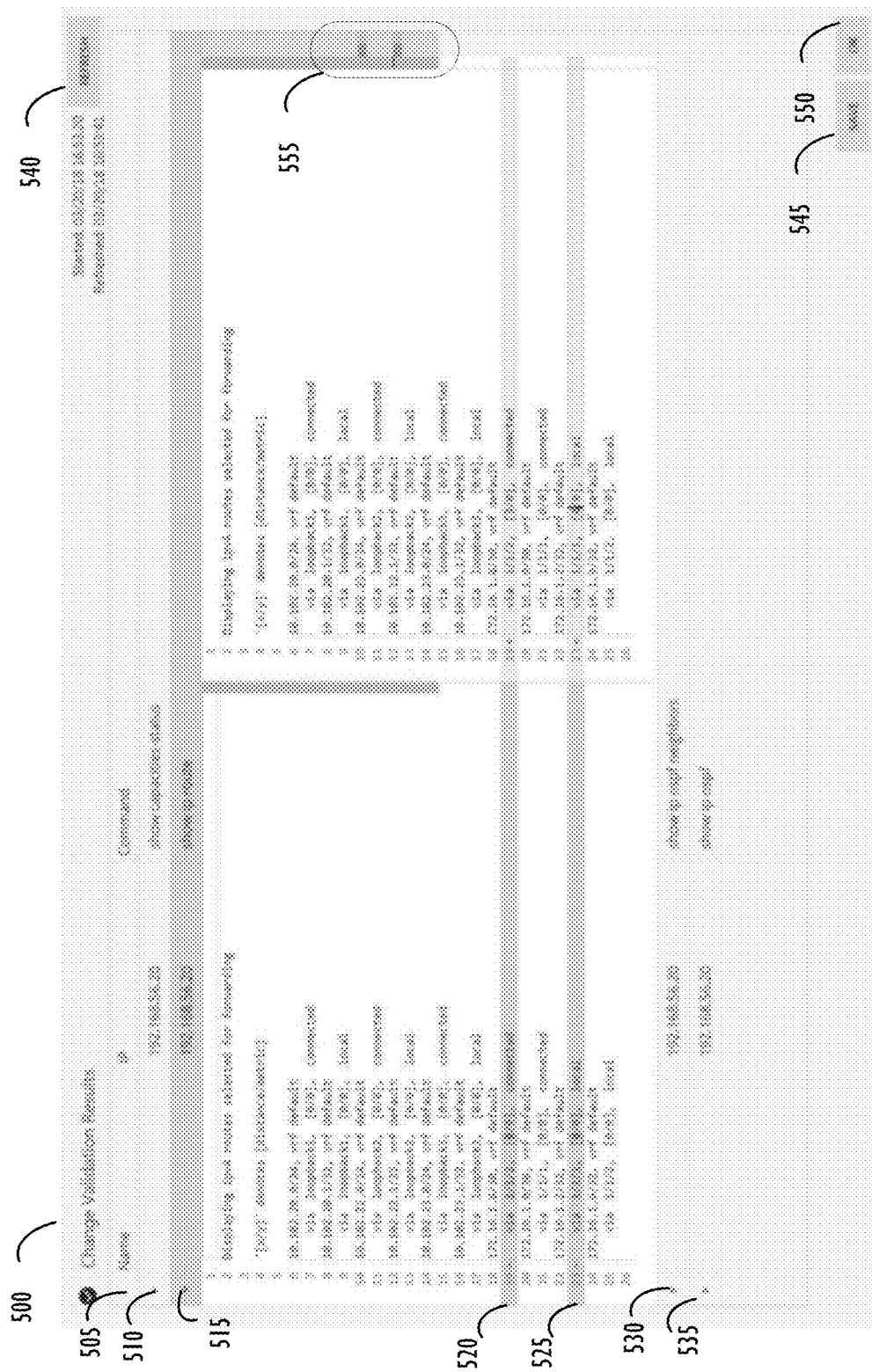
FIG. 5 is a screen shot showing one possible user interface for a system administrator to view validation change results as part of monitoring configuration change effect on a network infrastructure, according to one or more disclosed implementations.

As used herein, the term "validation viewer" refers to an editor or viewer style graphical interface capable of showing results of multiple validation actions in a comprehensive manner (See FIG. 5). The validation viewer may be configured to show a side by side annotated comparison of command set results, for example representing before change and after change command results. In some implementations the validation viewer may initiate a re-execution of a command set and populate a current view with up to date comparison information to assist the system administrator monitoring a change to a network. For example, the system administrator may only be required to hit a single "refresh" button to cause the validation view to repeat a portion of a validation command sequence (e.g., one or more command sets or test actions) to recollect information pertaining to a current view as selected by the system administrator.

Referring now to FIG. 1, networked computing infrastructure 100 is illustrated in a block diagram and represents an example in which implementations of the present disclosure may operate. For example, network devices such as switches, routers, gateways, and wireless access points may have their configuration changes validated using the disclosed network configuration change validation environment described below with reference to FIG. 3. Networked computing infrastructure 100 comprises a customer network 102, network 108, and a "backend" cloud or server resources platform/network 110. In one example, the customer network 102 may be a local private network, such as local area network (LAN) that includes a variety of network devices that include, but are not limited to switches 150, 151, 152, and 153), servers, wireless access points (WAPs) 154-155, and routers. Each of these networks can contain wired or wireless programmable devices and operate using any number of network protocols (e.g., TCP/IP) and connection technologies (e.g., WiFi® networks, Bluetooth®).

In another example, customer network 102 represents an enterprise network that could include or be communicatively coupled to one or more local area networks (LANs) that may be implemented as different subnets (e.g., subnet A 161, subnet B 162, and subnet C 153), virtual networks, data centers, and/or other remote networks (e.g., 108, 112). Because of the complexity of network configuration, it is possible that a configuration change to router 150 may have an adverse effect on devices behind router 152 that supports customer subnet B 162. That is, changes well outside a subnet may have adverse consequences to devices within a subnet. Accordingly, it may be desirable to utilize the disclosed automated change validation system, that may include tests for devices on subnet B 152 (and all other subnets), when implementing any changes within customer network 102. Otherwise, a system administrator may not realize that a change to router 150 created issues within subnet B 152 (or elsewhere in remote portions of a customer network). Determination of changes affecting remote portions of the network may be particularly problematic when the remote portions are logically, physically, or geographically distant from the change. For example, if router 150 and customer subnet B 162 are not in geographic proximity to each other, then a system administrator may not notice or be timely informed of errors introduced on subnet B when using ad hoc validation change methods that are not automated and/or comprehensive.

As shown in FIG. 1, customer network 102 may be connected to one or more client devices 104A-E and allow the client devices to communicate with each other and/or with backend cloud or server resources platform/network 110 (e.g., via network 108). Client devices 104A-E may be computing systems such as desktop computer 104B, tablet computer 104C, mobile phone 104D, laptop computer 104E (shown as wireless), and/or other types of computing systems generically shown as client device 104A. Networked computing infrastructure 100 may also include other types of devices generally referred to as Internet of Things ("IoT") (e.g., edge IOT device 105) that may be configured to send and receive information via a network to access network services or interact with a remote web browser application (e.g., to receive information).

FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and backend cloud or server resources platform/network 110. Local compute resource 106 may also facilitate communication between other external applications, data sources, and services, and customer network 102.

Networked computing infrastructure 100 also includes cellular network 103 for use with mobile communication devices. Mobile cellular networks support mobile phones and many other types of mobile devices such as laptops etc. Mobile devices in networked computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points 154, 155, and routers (e.g., local compute resource 106). In addition, the mobile devices may interact with other mobile devices or with non-mobile devices such as desktop computer 104B and various types of client devices 104A for desired services.

As illustrated in FIG. 1, customer network 102 may also include a dedicated network device 150 (e.g., gateway or router) or a combination of network devices 150, 151, 152, and 153, that implement a customer firewall or intrusion protection system. Note that network device 150 may provide one or more of these capabilities for network 102, while network devices 151, 152, and 153 may provide one or more of these capabilities for their respective subnet (161, 162, and 163). Of course, one or more network devices may work together to provide specific security requirements as needed for different portions (e.g., subnets) of a network.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and backend cloud or server resources platform/network 110. Each of the computing networks within network 108 may contain wired and/or wireless programmable devices that operate in the electrical and/or optical domain. For example, network 108 may include wireless networks, such as cellular networks in addition to cellular network 103.

Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks. Any, or all of these devices may be adversely affected by a change to a network configuration that is not properly validated.

In FIG. 1, backend cloud or server resources platform/network 110 is illustrated as a remote network (e.g., a cloud network) that is able to communicate with client devices 104A-E via customer network 102 and network 108. Backend cloud or server resources platform/network 110 could alternatively be implemented using systems that are part of customer network 102 (i.e., dedicated customer server resources). However, when implemented using a cloud infrastructure as shown, backend cloud or server resources platform/network 110 acts as a platform that provides additional computing resources to the client devices 104A-E and/or customer network 102.

For example, by utilizing backend cloud or server resources platform/network 110, users of client devices 104A-E may be able to build and execute applications, such as automated processes for various enterprise, IT, and/or other organization-related functions. In one example, backend cloud or server resources platform/network 110 includes one or more data centers 112, where each data center server instance 114 could correspond to a different geographic location. Each data center server instance 114 may be implemented on a physical computing system, such as a single electronic computing device (e.g., a single physical hardware server) or could be in the form a multi-computing device (e.g., multiple physical hardware servers). Examples of data center server instances 114 include, but are not limited to, a web server instance (e.g., a unitary Apache installation), an application server instance (e.g., unitary Java Virtual Machine), and/or a database server instance (e.g., a unitary MySQL catalog).

As is illustrated in FIG. 1, networked computing infrastructure 100 may contain many different network devices that may each require configurations to allow the network(s) as a whole to function properly. Each of these network devices may be maintained and configured using the disclosed network configuration change validation environment. Further, the disclosed network configuration change validation environment may also execute on various portions of networked computing infrastructure 100. Given the complexity and number of different protocols and devices shown in networked computing infrastructure 100, it should be apparent that the disclosed network change validation environment may provide benefits and improvements for the network administrator.

Figure 2:
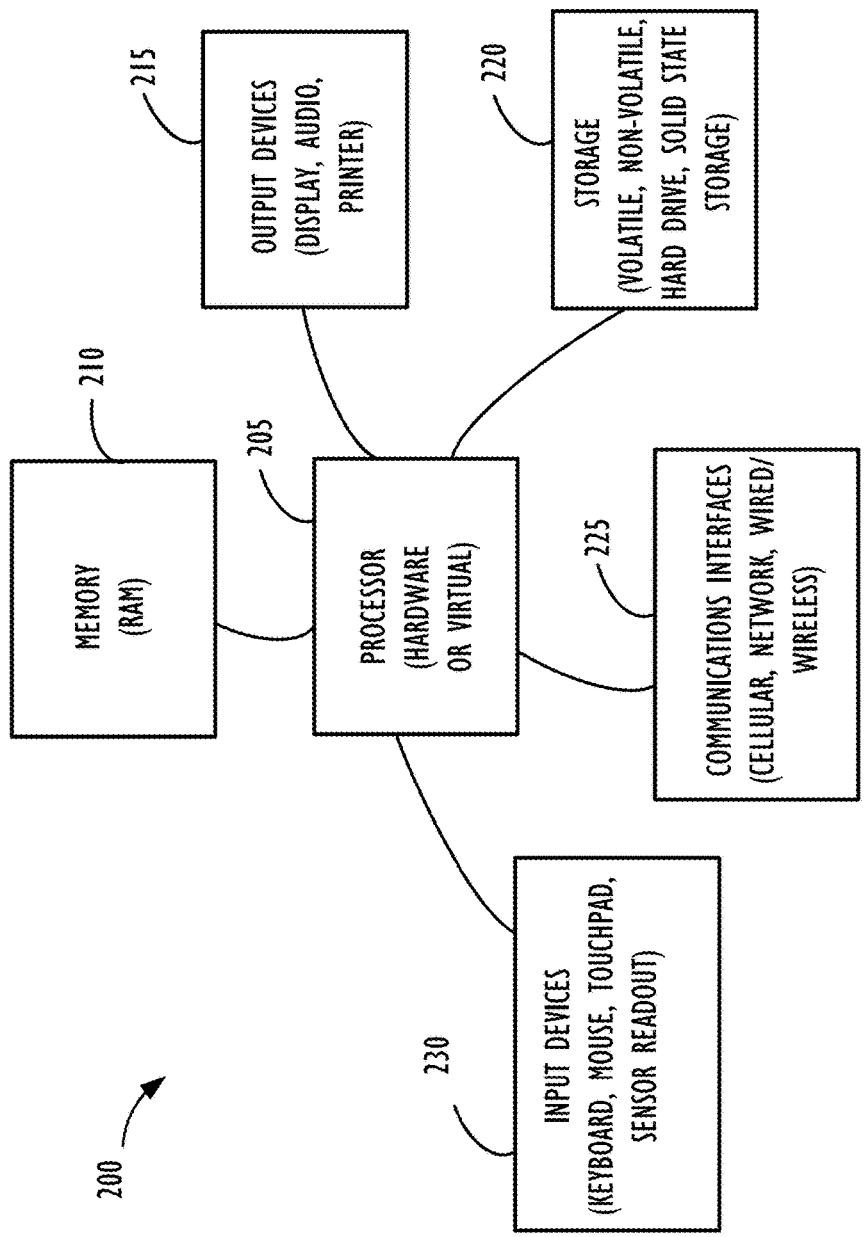
FIG. 2 is high-level block diagram of a computing device that may be configured to perform one or more disclosed methods or processes.

FIG. 2 illustrates a high-level block diagram of a computing device 200 (e.g., computing system or network device as shown in FIG. 1) that may be used to implement one or more disclosed examples (e.g., a validation viewer as part of a network configuration change validation environment and the network devices it supports). For example, computing device 200, illustrated in FIG. 2, could represent a client device or a physical server device from network infrastructure 100 and could include either hardware or virtual processor(s) depending on the level of abstraction of the computing device. In some instances (without abstraction) computing device 200 and its elements as shown in FIG. 2 each relate to physical hardware. Alternatively, in some instances one, more, or all of the elements could be implemented using emulators or virtual machines as levels of abstraction. In any case, no matter how many levels of abstraction away from the physical hardware, computing device 200 at its lowest level may be implemented on physical hardware.

As also shown in FIG. 2, computing device 200 may include one or more input devices 230, such as a keyboard, mouse, touchpad, or sensor readout (e.g., biometric scanner) and one or more output devices 215, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), WI-FI, cellular, and/or other communication methods.

As illustrated in FIG. 2, computing device 200 includes a processing element, such as processor 205, that contains one or more hardware processors, where each hardware processor may have a single or multiple processor cores. In one example, the processor 205 may include at least one shared cache that stores data (e.g., computing instructions) that are utilized by one or more other components of processor 205. For example, the shared cache may be a locally cached data stored in a memory for faster access by components of the processing elements that make up processor 205. In some cases, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 2, the processing elements that make up processor 205 may also include one or more other types of hardware processing components, such as graphics processing units (GPUs), application specific integrated circuits (ASICs), field-programmable gate arrays (FPGAs), and/or digital signal processors (DSPs).

FIG. 2 illustrates that memory 210 may be operatively and communicatively coupled to processor 205. Memory 210 may be a non-transitory medium configured to store various types of data. For example, memory 210 may include one or more storage devices 220 that comprise a non-volatile storage device and/or volatile memory. Volatile memory, such as random access memory (RAM), can be any suitable non-permanent storage device. The non-volatile storage devices 220 can include one or more disk drives, optical drives, solid-state drives (SSDs), tap drives, flash memory, read-only memory (ROM), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 205. In one instance, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 200 may comprise other components well known in the art, such as sensors, powers sources, and/or analog-to-digital converters, not explicitly shown in FIG. 2.

As mentioned above, the disclosed validation viewer represents an improvement to the art of network configuration and administration by providing an intuitive and concise presentation that enables a network administrator to see the similarities and differences across multiple devices and network segments before and after a configuration change. Further, the validation view may include fully automated portions such that the validation may be performed within a change window. Additionally, the validation view includes an intelligent "differencing interface," so the network administrator may be assisted in identifying relevant changes to results of automated actions, including test actions and command sets, to determine whether they should continue or roll-back one or more changes applied in a given change window.

Figure 3:
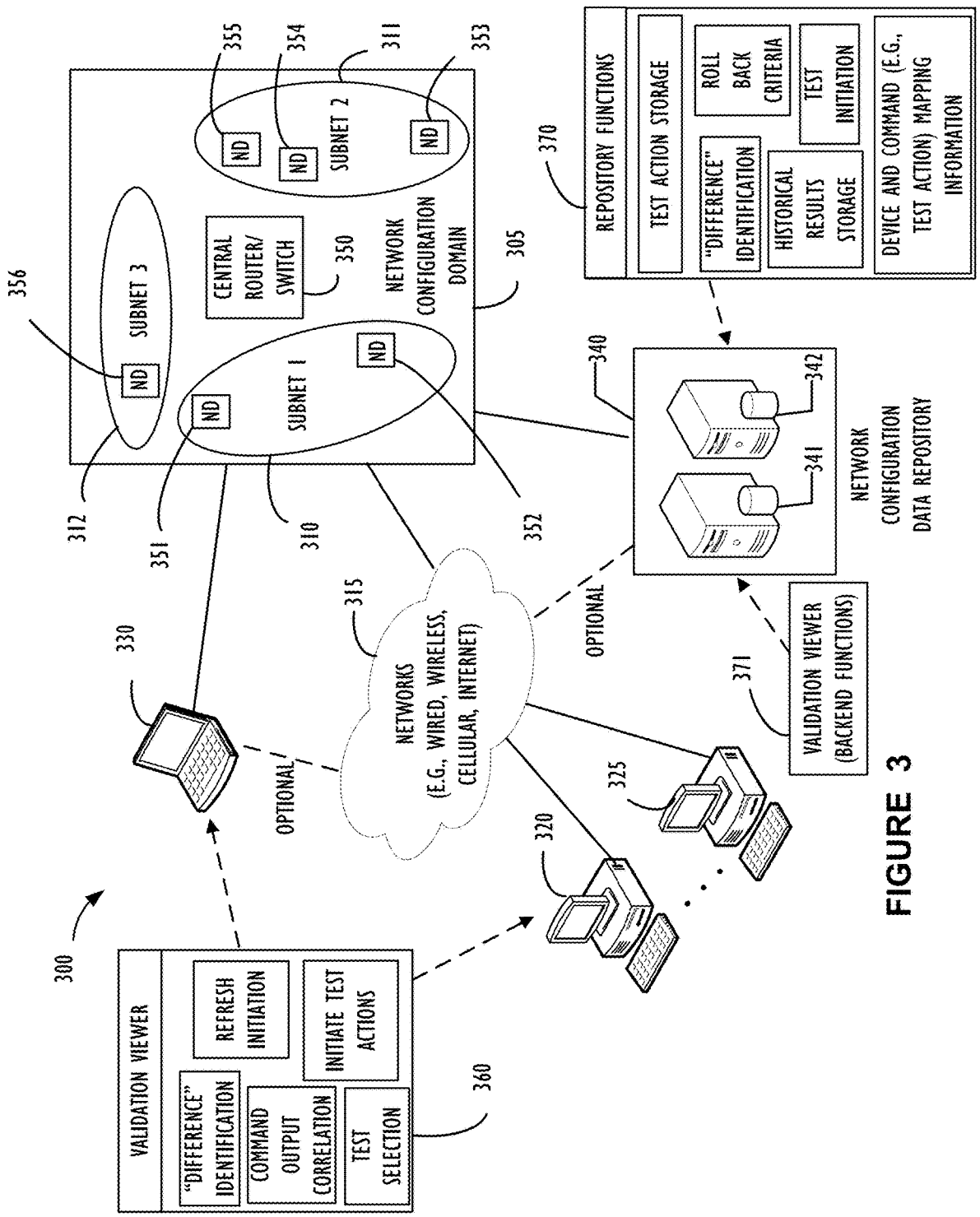
FIG. 3 is block diagram of multiple network administrator endpoints connected through a network to a backend processing system configured to support a network configuration change validation environment, according to one or more disclosed implementations.

Referring now to FIG. 3, block diagram 300 illustrates multiple computers that may serve as network administrator endpoints (e.g., computers 320-325, and 330) connected through at least one network to a backend processing system (e.g., network configuration data repository 340) configured to support a network configuration change validation environment, according to one or more disclosed implementations. Each network administrator endpoint may facilitate execution of the disclosed validation viewer interface 360 for working within a network configuration change validation environment.

Block 360 indicates that validation viewer functions may include, but are not limited to, difference identification; refresh initiation; command output correlation; test selection; and initiate test actions. In general validation viewer 360 may be presented as a graphical user interface front-end to an application executing locally or to a remotely executing application and may, in some cases, be provided via a web interface (e.g., web browser or web application). Some of the functions outlined for validation view 371 (backend functions) (e.g., difference identification) may be performed as part of repository functions 370, by validation viewer interface 360, or by both depending on implementation criteria (e.g., performance and security requirements).

In this example, network configuration data repository 340 is configured to use servers 341 and 342 to maintain data to support a network configuration change validation environment for network configuration domain 305. Servers 341 and 342 may be configured to maintain data representative of network configuration validation and test results as well as test actions (e.g., monitoring commands) corresponding to individual network devices within network configuration domain 305. In one example implementation attributes may be stored within a relational data base (not shown) such that data may be extracted in a manner to support a proper association with corresponding individual network devices. Block 370 indicates that functions performed by network configuration data repository 340 include, but are not limited to, test action storage; difference identification; historical results storage (e.g., timeseries data); test initiation criteria; roll back criteria; and device and command mapping information (e.g., the above-mentioned association between test action commands and individual network devices). Validation viewer 371 may have backend functions configured to execute on processors of network configuration data repository, or they may execute, as appropriate, as distributed components throughout the network. Actual execution locations are implementation dependent and may vary based on many factors. Each of these aspects will be discussed in more detail below.

In the example of FIG. 3, networks 315 represent optional communication networks that are not considered part of network configuration domain 305 but may allow for system administrators to interact with network configuration data repository 340 from remote locations or even mobile devices (e.g., laptop 330, or a mobile smart phone).

Continuing with FIG. 3, network configuration domain 305 represents, in this example, an enterprise network (e.g., similar to customer network 102 from FIG. 1) that may be maintained by one or more system administrators. In this example, the one or more system administrators may use the disclosed validation viewer interface 360 capability (executing on, for example, computers 320-325, or 330) to interact with network configuration data repository 340 to monitor status of network devices (351-356) in network configuration domain 305. As shown, network configuration domain 305 includes a central router/switch 350, and three subnets (i.e., subnet 1 310, subnet 2 311, and subnet 3 356). A total of seven network devices (i.e., ND 351, ND 352, ND 353, ND 354, ND 355, ND 356, and central router/switch 350) are shown in network configuration domain 305.

Note that, in practice, there may be hundreds or even thousands of network devices within an actual network configuration domain of a large corporation or enterprise, but for simplicity only seven are shown here. In modern enterprise networks, most network devices are dedicated switches, routers, or bridges, however, server computers may be configured to perform functions of a network device and may be used in that manner by smaller entities. The concepts of this disclosure are not limited to dedicated network devices and may work advantageously with any existing device configured to support networking functions.

Using disclosed techniques, before configuration changes are committed to a set of network devices, a customizable set of test actions (e.g., commands) may be automatically executed on some, or all, of the network devices and other systems on the network. Test actions may be initiated by remote invocation of a script via a command line interface made available from certain network devices. Alternatively, and agent could be deployed to and maintained resident on certain network devices. This agent could in turn receive requests from, for example, network configuration data repository 340, to initiate local test action commands. Other invocation methods are also possible. In any case, invocation of test actions may be made in a controlled manner both before and after a configuration change. Test actions may be performed sequentially or in parallel as defined in network configuration data repository 340. In some cases, there may be a portion of test actions performed sequentially, followed by test actions in parallel, or the reverse.

Control of which test actions are performed on which devices may be maintained within network configuration data repository 340 and initiation of test actions may be performed by invoking repository functions 370, that in turn, cause local commands to execute on applicable devices. For example, a system administrator using validation viewer 360 may request collection of metrics associated with a set of test actions. The output of these test actions may be collected and stored in network configuration data repository as a record of the network operation state before a planned configuration change (or periodically). Simple network management protocol (SNMP) may also be used to collect information from certain devices.

After a configuration change has been deployed, the same set of commands that was run before the change may be automatically executed again, and the output collected as a record of the network operation state after the configuration change. A display of these two sets of command output may be displayed together, for example within validation viewer 360. Differences that reflect a change in network operation may be highlighted (see FIG. 5). In this manner, a network administrator may be able to view the comparison of a network state before, and after, the configuration change in order to validate that only the expected changes in operation have occurred.

Some of the test actions are preferably executed on network devices that were not targeted with a configuration change during this maintenance window. Capturing the state of the network from devices that are not changed may provide valuable information to diagnose an issue or determine if a change is not acceptable. As mentioned above, it may be possible for a change in one area of a network to have unintended consequences on remote portions of the same network configuration domain.

Depending on the configuration change, the network may transition, from the before state to the after state, over a period of time. In this case, as the network stabilizes, the administrator can periodically refresh a comparison provided by validation viewer 360 and watch as the network converges to a stable point. It may take different amounts of time for different protocols that are active in the network configuration domain 305 to stabilize after a change. As explained above, the set of test action commands to be executed on the devices and other systems may be set up before the network configuration change. One example test action may be to cause a Microsoft Windows™ machine to run an "ipconfig/all" command and capture the output from that command. Another would be to have a Linux system run a "netstat" command and capture the output of that command. The idea being, that test actions may be commands executed locally on different devices throughout the network to obtain a set of information from the perspective of that device. These test action command sets may be reused as changes are made to the network. Also, because the set of devices and other systems, and mapping to test action command sets that should be executed on certain devices, may have also set up beforehand and stored in network configuration data repository 340, change validation may be incorporated into a change workflow process. Further, because of automation provided by a network configuration change validation environment it may be possible to provide comprehensive validation after network changes within a short maintenance window, thereby representing an improvement to the technical field of network administration as compared with prior art techniques.

The systems that state information may be collected from may also include non-wired network systems such as wireless network controllers, dynamic host configuration protocol ("DHCP"), and domain name services ("DNS"), business application servers, critical clients, or IoT devices, etc. The choice of devices and systems for state information collection may be enterprise business specific and may be customized and controlled by information in network configuration data repository 340 as needed. The display of the before and after state information may be presented using an intelligent difference format, with the significant differences highlighted (e.g., in validation view 360). For example, if the network configuration change inadvertently modified the routing within the network, the number of routes may be reduced in number. This possible undesired change may then be highlighted in the display to draw the attention of a network administrator.

In some cases, the information collected before and after may be expected to be different given the natural variations in network operation. For example, the number of packets entering and leaving a network switch would vary based on network client activity. The intelligent difference format would highlight these differences only if they deviated from the normal envelope of operation (e.g., as defined by a threshold). The envelop, or baseline profile, of normal operation may be learned from a time-series database of network configuration data repository 340. For example, test actions may be run periodically (or at varying times) to collect metrics to indicate the network state information that is collected and maintained for future comparison. Network data repository 340 may also contain test initiation criteria include records for each device and system, including its name, network address, type of device or system, and credentials necessary to execute commands.

Figure 4A:
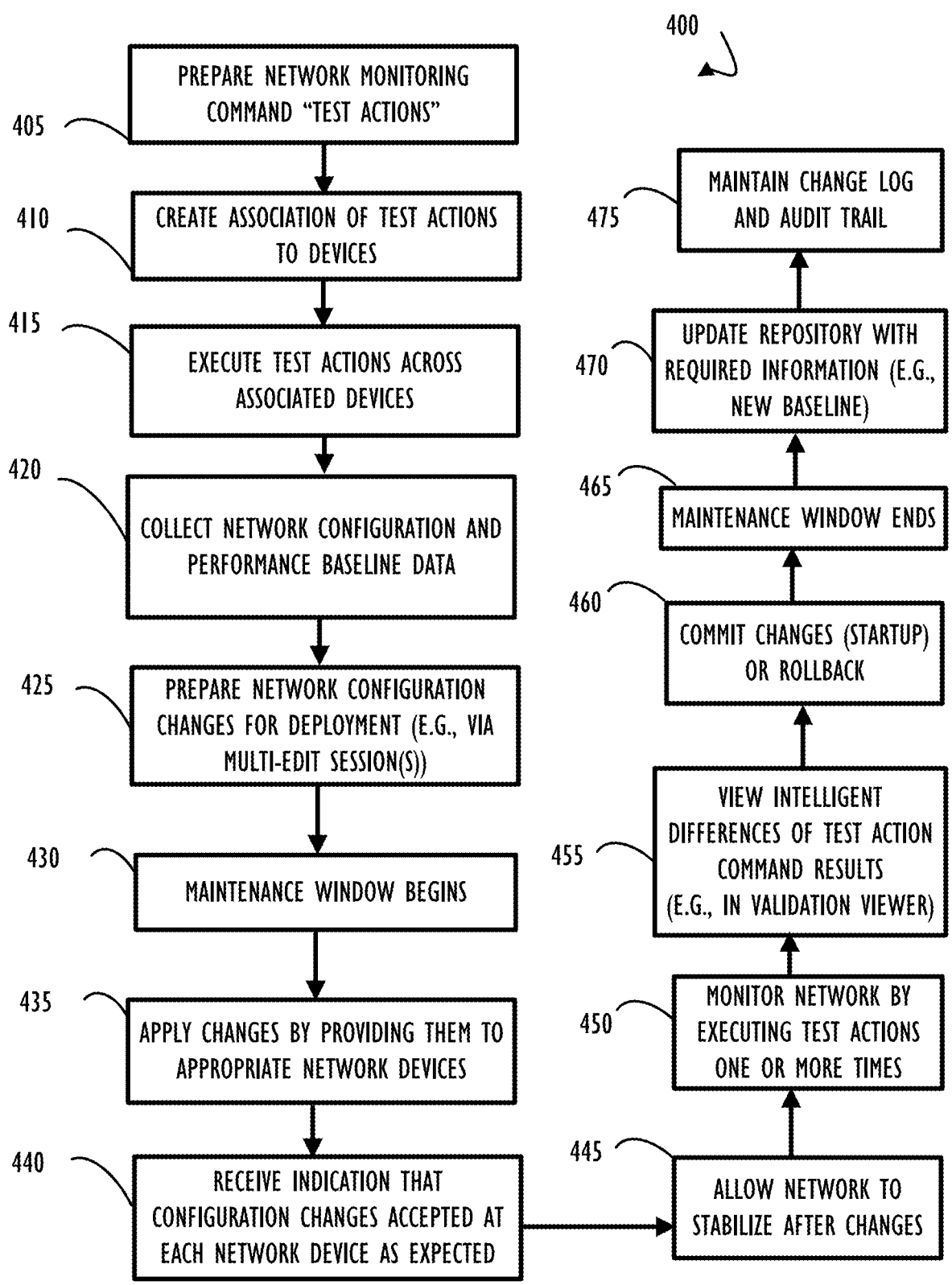
FIGS. 4A-B are flow charts of example processes representing two possible methods of validating a network configuration change that includes collecting and analyzing network configuration and network performance information in a controlled and repeatable manner prior to and after a configuration change, according to one or more disclosed implementations.

Referring now to FIG. 4A, process 400 is illustrated in flow chart form and represents one possible method of collecting and comparing network state using a set of test actions before and after a network configuration change, according to one or more disclosed implementations. Beginning at block 405, an association is created to connect test actions with specific network devices on which to execution those test actions. The association may be maintained, for example, in network configuration data repository 340. Block 415 indicates that the test actions may be executed on their associated devices and results of those commands may be collected. Block 420 indicates that collected network configuration and performance data, e.g., results from block 415, may be used to prepare a baseline data set. Block 425 indicates that a set of one or more network configuration changes may be prepared for coordinated deployment. For example, a multi-edit capability may be used to prepare a set of coordinated configuration changes. The multi-edit capability is described in U.S. patent application entitled, "System for Simultaneous Viewing and Editing of Multiple Network Device Configurations," by Clark et al., incorporated by reference above.

Block 430 indicates that a maintenance window, where changes to a network configuration are permitted, begins. Block 435 indicates that configuration parameter settings may be applied to appropriate network devices. Block 440 indicates that a status indication reflects that the configuration changes have been accepted at each network device as expected for this deployment. Block 445 indicates that a network administrator may wait for a short period of time to allow the network to stabilize after changes. For example, the network administrator could view and refresh network status using a validation viewer 360 as disclosed (see FIG. 5). Block 450 indicates that the network may be monitored by executing test actions on specified network devices one or more times while waiting to determine if the network has stabilized.

Once stabilized, block 455 indicates that the system administrator may view an intelligent difference format, for example as provided by validation viewer 360, to see differences in test action command results. For example, the system administrator may use validation viewer 360 to compare a previously stored baseline set of network state information to a currently collected (i.e., collected after change and stabilization) set of network state information. Block 460 indicates that, if everything is working as expected in the network, changes may be "committed" to network devices by altering their startup configuration settings. Alternatively, if an error occurs (or unexpected results) a rollback may be performed by re-deployment of previous configuration parameter settings to the running configuration or even by initiating a restart of network devices. As is typical of most network devices, a restart of a network device will cause that device to purge its running configuration and reload from its startup configuration.

Block 465 indicates the maintenance window ends and the network administrator should not, unless extenuating circumstances are present, perform further configuration changes at this time. Block 470 indicates that the data repository may be updated to reflect the actions performed in this deployment and/or to create a new baseline set of network state information. Block 465 indicates that any change log or audit trail information may also be stored to reflect, for example, the time of change, what was changed, and to track who initiated the changes.

Figure 4B:
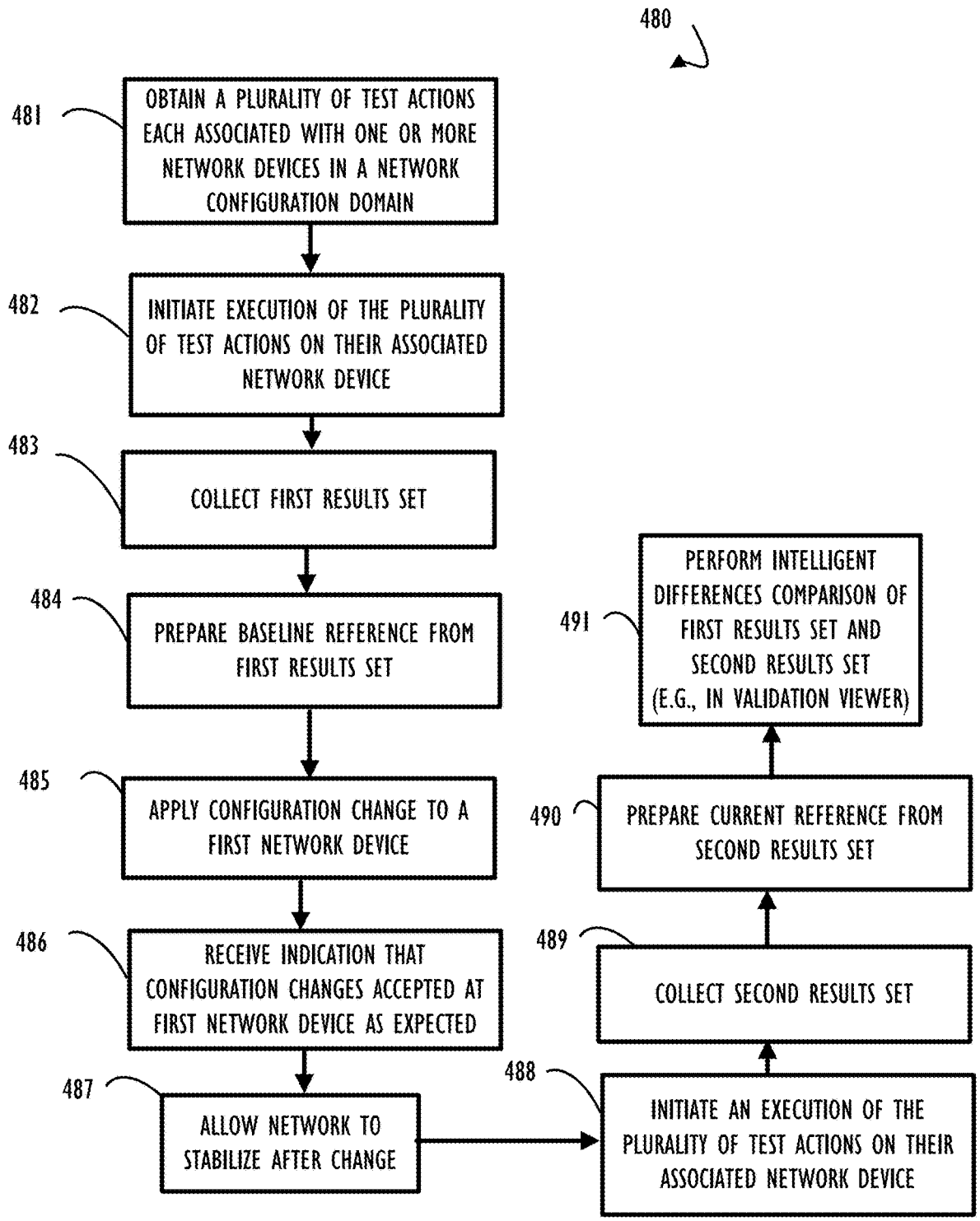

Referring now to FIG. 4B, process 480 is illustrated in flow chart form and represents a second possible method of collecting and comparing network state using a set of test actions before and after a network configuration change, according to one or more disclosed implementations. Beginning at block 481, a plurality of test actions that are each associated with an identified network device(s) within a network configuration domain may be obtained. Once obtained, block 482 indicates that they may each be executed on their appropriate devices. For example, through remote execution initiation or by having a function local on the device initiate execution. Block 483 indicates that a first set of results from command executions may be collected. Block 484 indicates that a baseline reference of the network state may be created using these command results. Note that a baseline state may be updated from time to time and does not necessarily remain static. For example, adding a set of devices or a new subnet to a network may make it desirable to update a baseline state. Block 485 indicates that a configuration may be applied to a first network device. Block 486 indicates that the device has accepted the network configuration change and has updated its behavior in the network accordingly. Block 487 indicates that the network may be allowed to stabilize after the change. Block 488 indicates that an execution of the plurality of test actions are executed again. For example, it may be preferable to use exactly the same test actions from block 482 or only a slight variation of them. Block 489 indicates that a second results set may be collected. Block 490 indicates that a current network state may be obtained, for example, through analysis of the second results set. Process 480 ends at block 491 where an intelligent difference may be performed by comparing the first and second results sets. For example, to determine if there are any significant changes that should be provided to a system administrator. Also, the intelligent differences output may be presented using validation viewer 360.

FIG. 5 illustrates a screen shot showing an example of one possible graphical user interface display for validation viewer 360 with an intelligent differencing format, according to one or more disclosed implementations. Change validation results window 500, in this example, shows that screen area 505 lists Internet Protocol ("IP") addresses, names for test actions, and commands in a set of selectable tabs beginning with selectable screen tab 510. For tab 510, in this example, the name portion has been left blank, which is an option.

The IP address of the command "show capacities-status" is shown to be 192.168.56.20 for the test actions related to the first displayed tab 510. The command may be a single command or a set of commands (e.g., a test action) stored in network configuration data repository 340, for example. In this example screen shot, selectable tab 515 has been "expanded" to display an intelligent differences result portion associated with the command name "show ip route" executed, for example, on a device with IP address 192.168.56.20. In alternate implementations, the name portion of each selectable tab may show the name of a hostname for which the test action is associated or may show a name for a test action. Lines 520 and 525 reflect that, based on an intelligent differences algorithm, a difference in the before (e.g., left side) and after (e.g., right side) results for the "show ip route" test action has been found.

The intelligent differences algorithm may execute on different devices within the disclosed network configuration change validation environment. The intelligent differences algorithm may perform a standard diff between two sources of information, identify which differences are pertinent with respect to network configuration, and further identify which differences (of the pertinent ones) are significant and/or related to a just applied network configuration change. These concepts may be implemented using machine learning techniques and artificial intelligence techniques that may execute with access to data stored within network configuration repository 340. In short, the intelligence differences algorithm is intended to identify only areas of interest to a system administrator and eliminate any differences in command output that may be considered "noise" because they are not related to the recently applied configuration change. In this regard, the intelligent differences algorithm may utilize any available data source and not be limited to information within network configuration data repository 340. For example, if a help desk (e.g., trouble ticket) application has an available data store that indicates a server has had a hard disk crash and is going to be powered down during the same maintenance window, failed ping responses from that server for this change validation may not be given the same priority (may even be ignored) as it would without the change ticket information.

Returning to FIG. 5, selectable tabs 530 and 535 show additional commands that are available for expansion or further inspection. Refresh selection tab 540 may be used (as explained with FIG. 4 above) to automatically refresh (e.g., re-execute test actions) data and difference information on a change validation results screen. For example, as the network stabilizes after a configuration change, a system administrator may monitor the network repeatedly by hitting refresh 540 one or more times to obtain a near real-time view of the network state relative to its baseline. The information on a display may be dynamically updated from the simple command output (before only, not shown) to the intelligent differences view (before-vs-after, as shown), for example as the results of the command outputs and/or intelligent difference processing become available. The save selection tab 545 may be used to archive a copy of the change validation results that may later be reviewed or audited, for example, after the change process is complete. The OK selection tab 550 may be used to dismiss the change validation results. For example, it may be used when the network administrator has completed their validation of the change. Also, of note are the colored markers 555 in the scrollbar, these indicate the portions of the entire difference information displayed in window 500 that contain relevant changes as identified by the intelligent differences algorithm. These colored markers may inform the administrator where in the scrollable file there are changes that they may wish to scroll to and review.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to. . . . " Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A method comprising:
   obtaining a plurality of test actions, each test action associated with at least one network device within a first network portion associated with a network configuration domain, the network configuration domain comprising multiple network portions;
   initiating a first execution of each of the plurality of test actions on their at least one associated network device;
   analyzing first results of the first execution to create a baseline reference of network state;
   applying a configuration change to a first network device within the first network portion;
   allowing activity on the first network portion to stabilize after receiving an indication that the configuration change was applied;
   initiating a second execution of each of the plurality test actions from the set of one or more test actions on their associated network device;

analyzing second results of the second execution to create a post-change reference of network state;

performing an intelligent differences analysis comparison of the baseline reference of network state with the post-change reference of network state to identify a subset of differences in network state;

preparing the subset of differences in network state for presentation on a user interface;

receiving an instruction to refresh the intelligent difference analysis, wherein the instruction is associated with a current view on the user interface and is further associated with a first portion of the plurality of test actions; and in response to the instruction to refresh, initiating a third execution of the first portion of the plurality of test actions and analyzing third results of the third execution to update the post-change reference network state.

2. The method of claim 1, wherein allowing activity on the first network portion to stabilize after receiving an indication that the network configuration change was applied comprises monitoring the first network portion until a currently monitored state indicates that the first network portion has stabilized.

3. The method of claim 1, wherein the first portion represents a subnet.

4. The method of claim 1, wherein the first network portion represents a physical network portion.

5. The method of claim 1, wherein preparing the subset of differences comprises associating visual cues with differences identified as significant.

6. The method of claim 1, wherein performing an intelligent differences analysis comprises:

performing an intelligent differences analysis using a portion of a time series data store, the portion indicating a nominal operating state profile for at least one value in the post-change reference of network state and adding at least one difference to the subset of differences when the at least one value is anomalous with respect to its nominal operating state value.

7. The method of claim 1, further comprising presenting results of the intelligent difference comparison on the user interface.

8. The method of claim 7, wherein the user interface is a remotely connected graphical user interface provided on a computer system external to the network communication domain.

9. The method of claim 1, wherein performing an intelligent differences analysis comprises:

performing an intelligent differences analysis using a portion of a time series data store, the portion indicating a range of operating state values for at least one value in the post-change reference of network state and treating at least one difference from the subset of differences as an insignificant difference when the at least one value is within the range of operating state values.

10. The method of claim 1, wherein at least one of the plurality of test actions is executed on a network device within the network configuration domain but outside the first network portion.

11. A non-transitory computer readable medium comprising computer executable instructions stored thereon that when executed by one or more processing units, perform a method to provide a network change validation function to compare at least two different network states, the method comprising:

obtaining a plurality of test actions, each test action associated with at least one network device within a first network portion associated with a network configuration domain, the network configuration domain comprising multiple network portions;

initiating a first execution of each of the plurality of test actions on their at least one associated network device;

analyzing first results of the first execution to create a baseline reference of network state;

applying a configuration change to a first network device within the first network portion;

allowing activity on the first network portion to stabilize after receiving an indication that the configuration change was applied;

initiating a second execution of each of the plurality test actions from the set of one or more test actions on their associated network device;

analyzing second results of the second execution to create a post-change reference of network state;

performing an intelligent differences analysis comparison of the baseline reference of network state with the post-change reference of network state to identify a subset of differences in network state;

preparing the subset of differences in network state for presentation on a user interface;

receiving an instruction to refresh the intelligent difference analysis, wherein the instruction is associated with a current view on the user interface and is further associated with a first portion of the plurality of test actions; and in response to the instruction to refresh, initiating a third execution of the first portion of the plurality of test actions and analyzing third results of the third execution to update the post-change reference network state.

12. A computer system, comprising:

a network communications interface;

a memory; and one or more processing units, communicatively coupled to the memory and the network communications interface, wherein the memory stores instructions, that when executed by the one or more processing units, cause the one or more processing units to provide a network change validation function to compare at least two different network states, the network change validation function configured to:

obtain a plurality of test actions, each test action associated with at least one network device within a first network portion associated with a network configuration domain, the network configuration domain comprising multiple network portions;

initiate a first execution of each of the plurality of test actions on their at least one associated network device;

analyze first results of the first execution to create a baseline reference of network state;

apply a configuration change to a first network device within the first network portion;

allow activity on the first network portion to stabilize after receiving an indication that the configuration change was applied;

initiate a second execution of each of the plurality test actions from the set of one or more test actions on their associated network device;

analyze second results of the second execution to create a post-change reference of network state;

perform an intelligent differences analysis comparison of the baseline reference of network state with the post-change reference of network state to identify a subset of differences in network state;

prepare the subset of differences in network state for presentation on a user interface;

receive an instruction to refresh the intelligent difference analysis, wherein the instruction is associated with a current view on the user interface and is further associated with a first portion of the plurality of test actions; and in response to the instruction to refresh, initiate a third execution of the first portion of the plurality of test actions and analyze third results of the third execution to update the post-change reference network state.

13. The computer system of claim 12, wherein the network change validation function is further configured to:

prepare the subset of differences in network state for presentation on a user interface.

14. The computer system of claim 12, wherein the user interface is a remotely connected graphical user interface.

15. The computer system of claim 14, wherein the remotely connected graphical user interface is a laptop, smart phone, or other mobile device.

16. The computer system of claim 12, wherein the network change validation function is further configured to utilize one or more external data sources to perform the intelligent difference and to eliminate at least one difference from the subset of differences based on information from the one or more external data sources.

17. The computer system of claim 16, wherein the one or more external data sources includes a help desk trouble ticket system associated with devices in the network configuration domain.

* * * * *